(12) United States Patent
Colicchio

(10) Patent No.: US 6,630,033 B2
(45) Date of Patent: Oct. 7, 2003

(54) METHOD AND APPARATUS FOR CONSERVING WATER IN A CAR WASHING APPARATUS

(76) Inventor: Louis Colicchio, 523 E. 86th St., Brooklyn, NY (US) 11236

( * ) Notice: Subject to any disclaimer, the term of this patent is extended or adjusted under 35 U.S.C. 154(b) by 2 days.

(21) Appl. No.: 10/229,487

(22) Filed: Aug. 28, 2002

(65) Prior Publication Data

US 2003/0034047 A1 Feb. 20, 2003

Related U.S. Application Data

(62) Division of application No. 09/469,532, filed on Dec. 22, 1999, now Pat. No. 6,464,063.

(51) Int. Cl.[7] .................................................. C23G 1/00
(52) U.S. Cl. .......................... 134/2; 194/242; 194/241; 194/904; 134/99.2; 134/123; 134/10; 239/407; 239/413; 239/127
(58) Field of Search ................................ 194/241, 242, 194/904; 134/310, 99.2, 123; 239/407, 409, 413, 310, 318, 127

*Primary Examiner*—Donald P. Walsh
(74) *Attorney, Agent, or Firm*—Muserlian, Lucas and Mercanti

(57) ABSTRACT

A high pressure car wash apparatus providing economy of both water and detergent by the recirculation of a portion of the water and detergent being utilized to a holding tank for reintroduction into the system.

9 Claims, 1 Drawing Sheet

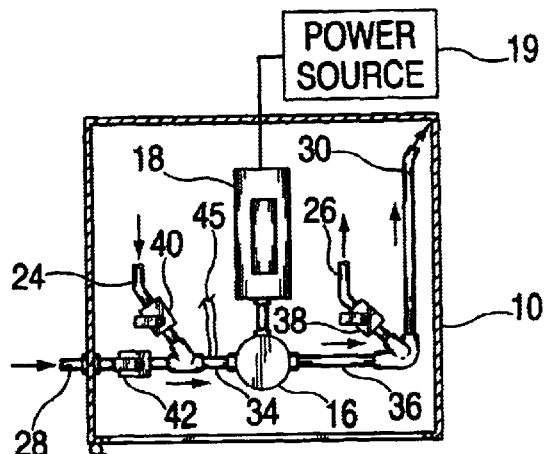
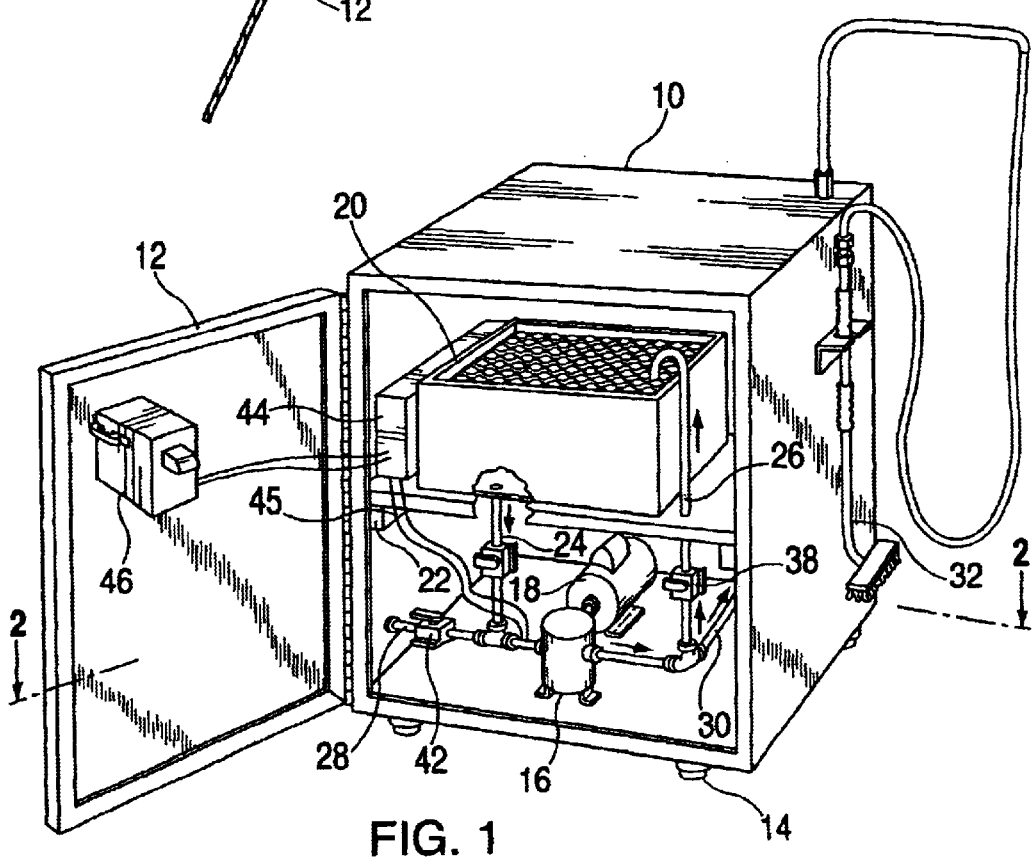

METHOD AND APPARATUS FOR CONSERVING WATER IN A CAR WASHING APPARATUS

CROSS REFERENCE TO RELATED PATENTS

This Application is a Divisional Application of U.S. application Ser. No. 09/469,532, filed Dec. 22, 1999, now U.S. Pat. No. 6,464,063.

BACKGROUND OF THE INVENTION

1. Field of the Invention

This invention relates to a high pressure, wand type car wash apparatus and a method for using the same which provides for water conservation.

2. Art Relating to the Invention

The wand type car wash apparatus differs markedly from the conventional car wash which functions on an assembly line principle wherein a plurality of spaced stations are provided, each station carrying out a different preassigned task on a moving vehicle. The wand type device is a compact unit by means of which all washing functions may be carried out in situ on a stationary vehicle. The wand type device is by design small, compact and readily movable if a change of location is desired.

Present wand type units make no provision, however, for basic economies, such as that of water and detergent. With the increasing frequency of water shortages, water economy is essential and water consuming devices, such as the one under consideration, have been the subject of criticism and even prohibition.

SUMMARY OF THE INVENTION

It is therefore an important object of the present invention to provide a high pressure wand type car wash apparatus which provides for certain economies, particularly that of water, while maintaining its compactness and mobility. The present invention also conserves detergent, thereby lowering the amount of detergent used and the amount of detergent released into the environment.

High pressure spray type car wash apparatus for saving water according to the present invention comprising a motor driven pump having an inlet and an outlet, a reservoir having an inlet and an outlet, a first supply conduit for conducting water from a tap, a second supply conduit for conducting liquid from the reservoir, said first and second supply conduits being in communication with the pump inlet, the pump outlet being in communication with two discharge conduits, a first discharge conduit in communication with the reservoir and a second discharge conduit in communication with a high pressure dispenser, a first valve means for regulating the flow of fluid from said pump outlet to said reservoir, means for injecting cleaning agents into the system, and a second valve means for automatically shutting off the flow of liquid from the reservoir to said pump inlet when pressurized tap water is entering the system.

Preferably, the reservoir is positioned to permit a gravity flow of liquid to the pump. A fitting is interposed in the line between pump outlet and the discharge conduits to split the flow of liquid from the pump. The first valve means is suitably a conventional valve for regulating the flow of liquid passing through the respective discharge conduits which are either manually or electronically controlled.

The reservoir is suitably positioned directly above the pump and interconnecting parts and the apparatus is housed within a protective casing with a portion of the discharge conduits with dispenser extending outwardly of the casing.

In particular, the apparatus is coin operated, the coin acting in association with an electrical switch which first actuates the pump motor and, after a predetermined period of time, stops it. The injection of detergent into the system being independently controlled by the operator by means of a soap switch or manually or by the coin apparatus to regulate the detergent.

The method of the present invention involves the use of the apparatus of the present invention to recirculate a portion of the water from the pump outlet to the reservoir. Preferably, about 50 to 90% of the output is recirculated to the reservoir. The method comprises dividing wash water from a pump into two streams, a first stream directed to a nozzle for washing the car and a second stream directed to a reservoir, storing said second stream in said reservoir during said washing thereby conserving some of said wash water, and returning some of said second stream from said reservoir to said pump to be used as said wash water.

Other objects and advantages of the device of the present invention may become more apparent from an examination of the following detailed description.

BRIEF DESCRIPTION OF THE DRAWINGS

FIG. 1 is a front elevational view of one embodiment of the apparatus of the present invention showing the apparatus mounted within a housing, and FIG. 2 is a sectional view taken on line 2—2 of FIG. 1 wherein elements are shown schematically for clarity.

DETAILED DESCRIPTION OF THE INVENTION

In FIG. 1 the device is shown housed within casing 10 provided with port 12 permitting access to its interior. Casters 14 depending from the bottom wall permit the unit to be readily moved about.

The device consists of a high pressure pump 16 interposed within a fluid system which terminates in a high pressure spray which may be used for car washing. In this instance the pump generates 500 lbs. per square inch and delivers 2 gallons of liquid per minute, the capacity of the pump and its delivery rate being a matter of choice.

The pump is powered by electric motor 18 housed in the lower portion of the casing, a power source 19 being exterior of the casing for powering motor 18.

A liquid reservoir 20 is supported in the upper portion of the casing by brackets 22. Supply conduit 24 puts the reservoir in communication with the pump on its upstream side while discharge conduit 26 puts the pump in communication with the reservoir on its downstream side. Thus, a first complete fluid circuit is provided.

A second supply conduit 28 puts the pump in communication with an external source of tap water, already somewhat pressurized by the system providing it. A second discharge conduit 30 puts the pump in communication, on its downstream side, with a cleaning wand 32 exteriorly mounted on an outside wall of the casing. Thus a second fluid circuit is provided.

The supply conduits combine at 34 at the pump inlet and the discharge conduits separate from a common duct 36 at the pump outlet. It may thus be seen that downstream the pump the two circuits share a common duct 36 and are in communication with one another.

When tap water is introduced into the system it will flow to pump 16 where it is further pressurized and, exiting pump 16, it will flow into each of the discharge conduits. Thus a portion of the pressurized water will flow to the cleaning wand 32 while the remaining portion will flow to reservoir 20 where it is reintroduced into the system through conduit 24.

A valve 38 is provided to control the quantity of water returning to reservoir 20. If the valve is completely closed there will be no recirculation of water. The valve may be a spring loaded release valve and may be manually controlled. Valve 38 will control the amount of water that is recycled to reservoir 20. This can be controlled manually or through conventional electric circuitry.

A check valve 40 is provided to close off the flow of liquid from the reservoir. This valve may be of the vertical flap type and is designed to close under pressure when tap water is introduced into conduit 28.

A solenoid valve 42 associated with conduit 28 opens and closes the system to tap water.

A detergent injection device 44 is employed to inject detergent, preferably liquid detergent, into pump inlet 34 by means of conduit 45. Alternatively, conduit 45 can be connected to pump outlet 36, however, it is preferred to be connected to pump inlet 34 to allow the action of pump 16 to mix the detergent and water. Such injectors as used with high pressure washers are well known and will not be described further, however, such a device can also be positioned downstream of the pump and can be controlled by soap switch or manually or the coin operating mechanism.

The instant high pressure washer may be advantageously employed as a car wash and when used as such may be electrically activated by the introduction of a coin into a receptacle 46 designed for that purpose. Timers are employed in conjunction with the electrical system to permit a predetermined period of use. Details of such circuitry are well known and, accordingly, are not shown. However, it will be recognized that a single processor (computer) can be used to control all of the pumps and the cycles employed by the device of the present invention. Such processors allow for programming of the cycles and for adjustment depending on the water pressure from the tap, the detergent used, the amount of water to be conserved, etc. The timer and coin receptacle 46 control the apparatus through the electric motor 18.

The unit offers a rinse cycle and a wash cycle, the choice and duration being controlled by the user through the valves (or by the device through the processor). In both cycles water is recirculated to the reservoir. In the rinse cycle, however, detergent is not introduced into the system and the flow of "soapy" water from the reservoir is prevented by valve 40 and from device 44. Detergent injector 44 is electrically coordinated with the system and injects during the wash cycle and cuts off during the rinse cycle.

It may thus be seen that the device of the present invention offers economies not only of water but of detergent, amongst other things, in addition to offering a compact, self-contained package ideally suited for use as a high pressure washer, particularly a coin operated wand type car wash.

What is claimed is:

1. A method for conserving water in a portable car washing apparatus comprising:
   (a) supplying wash water from a tap to a pump inlet via a second supply conduit;
   (b) injecting cleaning agents into the second supply conduit;
   (c) dividing wash water from a pump outlet into two discharge conduits, a second discharge conduit directed to a high pressure dispenser for washing the car and a first discharge conduit directed to a reservoir inlet, said first discharge conduit guiding a first stream and said second discharge conduit guiding a second stream;
   (d) regulating flow of the wash water in the first discharge conduit with a first valve means;
   (e) storing said second stream in the reservoir during washing thereby conserving some of the wash water;
   (f) returning some of the second stream from a reservoir outlet to the second supply conduit via a first supply conduit; and
   (g) regulating flow of the wash water in the first supply conduit with a second valve means.

2. The method of claim 1 wherein about 50% to about 90% of the wash water is divided into the first discharge conduit.

3. A method for conserving water in a portable car washing apparatus comprising:
   (a) conducting water from a tap via a first supply conduit;
   (b) conducting liquid from a reservoir via a second supply conduit, wherein said first supply conduit and said second supply conduit are in communication with a pump;
   (c) dividing wash water from the pump into two streams, a first stream directed to a nozzle for washing a car and a second stream directed to the reservoir;
   (d) storing said second stream in said reservoir during said washing thereby conserving some of said wash water; and
   (e) returning some of said second stream from said reservoir to said pump to be used as said wash water.

4. The method of claim 3 wherein about 50% to about 90% of said wash water is divided to form said second stream.

5. The method of claim 3 wherein cleaning agents are injected into the system.

6. The method of claim 3 wherein flow of liquid from the reservoir to the pump is automatically shut off when tap water enters the system.

7. The method of claim 3 wherein the flow of said second stream from the pump to the reservoir is regulated.

8. A method for conserving water in a portable car washing apparatus comprising:
   (a) conducting water from a tap via a first supply conduit;
   (b) conducting liquid from a reservoir via a second supply conduit, wherein said first supply conduit and said second supply conduit are in communication with a pump;
   (c) dividing wash water from the pump into two streams, a first stream directed to a nozzle for washing a car and a second stream directed to the reservoir;
   (d) regulating flow of said second stream from the pump to the reservoir;
   (e) storing said second stream in said reservoir during said washing thereby conserving some of said wash water; and
   (f) returning some of said second stream from said reservoir to said pump to be used as said wash water.

9. The method of claim 8 wherein about 50% to about 90% of the wash water is divided into the first discharge conduit.

* * * * *